United States Patent
Asawa et al.

(10) Patent No.: US 7,852,625 B2
(45) Date of Patent: Dec. 14, 2010

(54) INFORMATION PROCESSING APPARATUS

(75) Inventors: Tsutomu Asawa, Nagano (JP); Kenji Saito, Nagano (JP); Shingo Harada, Nagano (JP); Noriko Kito, Saitama (JP); Kaya Kanamori, Tokyo (JP); Yosuke Suzuki, Nagano (JP); Kiyohito Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 11/867,434

(22) Filed: Oct. 4, 2007

(65) Prior Publication Data

US 2008/0101000 A1    May 1, 2008

(30) Foreign Application Priority Data

Oct. 31, 2006    (JP) .............................. 2006-295248

(51) Int. Cl.
G06F 1/16    (2006.01)
(52) U.S. Cl. ................................. 361/679.55
(58) Field of Classification Search ............ 361/679.02, 361/679.55, 679.56
See application file for complete search history.

(56) References Cited

U.S. PATENT DOCUMENTS

| | | | | |
|---|---|---|---|---|
| 5,196,991 A * | 3/1993 | Hsieh | .................... | 361/679.17 |
| 6,219,227 B1 * | 4/2001 | Trane | .................... | 361/679.27 |
| 6,661,649 B2 * | 12/2003 | Tanaka et al. | .......... | 361/679.58 |
| 6,697,251 B1 * | 2/2004 | Aisenberg | .............. | 361/679.09 |
| 6,795,305 B2 * | 9/2004 | Tanaka et al. | .......... | 361/679.27 |
| 6,894,893 B2 * | 5/2005 | Hidesawa | .............. | 361/679.55 |
| 7,095,607 B2 * | 8/2006 | Imamura | ................ | 361/679.57 |
| 7,428,145 B2 * | 9/2008 | Kobayashi et al. | ..... | 361/679.55 |
| 7,453,689 B2 * | 11/2008 | Kim et al. | .............. | 361/679.55 |
| 7,542,274 B2 * | 6/2009 | Minaguchi et al. | ..... | 361/679.55 |
| 2005/0110761 A1 * | 5/2005 | Minaguchi et al. | .......... | 345/168 |

* cited by examiner

*Primary Examiner*—Lisa Lea-Edmonds
(74) *Attorney, Agent, or Firm*—Oblon, Spivak, McClelland, Maier & Neustadt L.L.P.

(57) ABSTRACT

An information processing apparatus includes a display section and a main body section. The display section is disposed on a first surface and has a display panel and a display panel case. The display panel case houses the display panel such that the display panel can display an image. The display panel case has a protrusion portion formed at a first end. The main body section is disposed on a second surface and has an input section and a depressed portion. The depressed portion is formed at a second end of the second surface and has a pierced portion and a housing portion. The pierced portion is formed from the second surface to an opposite surface thereof such that a battery is attached to the pierced portion. The housing portion axially houses the protrusion portion on a side opposite to the input section with respect to the pierced portion.

10 Claims, 8 Drawing Sheets

(a)

(b)

INFORMATION PROCESSING APPARATUS

CROSS REFERENCES TO RELATED APPLICATIONS

The present invention contains subject matter related to Japanese Patent Application JP 2006-295248 filed in the Japanese Patent Office on Oct. 31, 2006, the entire contents of which being incorporated herein by reference.

BACKGROUND OF THE INVENTION

1. Field of the Invention

The present invention relates to an information processing apparatus having a main body section and a display section.

2. Description of the Related Art

Portable information processing apparatus that are so-called laptop personal computers, mobile computers, and so forth have a main body section and a display section. The display section can be opened from and closed to the main body section for example with a hinge.

Since there has been a need of a long time operation for portable information processing apparatus, their battery has become large. Thus, since the apparatus have become large and thick, their portability has been impaired.

To solve such a problem, techniques have been proposed. As one of such techniques, an information processing apparatus has been disclosed in Japanese Patent Application Laid-Open No. 2000-330672 (paragraph 0014, FIG. 5) (hereinafter this related art is referred to as the patent document 1). This information processing apparatus includes a main body section, a first battery section, and a second battery section. The main body section executes a predetermined information process. The first battery section is mounted on a first surface of the main body section. The second battery section is rotatably held by the first battery section such that the second battery section approaches and leaves the main body section. When the second battery section is rotated toward the first battery section such that the first battery section approaches the main body section, one surface of the second battery section contacts a second surface adjacent to the first surface of the main body section.

SUMMARY OF THE INVENTION

According to the technique described in the foregoing patent document 1, although the battery sections have a large capacity, the planar size of the entire information processing apparatus can be decreased and correspondingly it can be easily carried. However, since the first and second battery sections are integrated along the first and second surfaces on which they are mounted, there arises a problem in that the information processing apparatus becomes thick.

In view of the foregoing, it would be desirable to provide an information processing apparatus that is downsized and thinned.

According to an embodiment of the present invention, there is provided an information processing apparatus. The information processing apparatus includes a display section and a main body section. The display section is disposed on a first surface. The display section has a display panel and a display panel case. The display panel case houses the display panel such that the display panel is capable of displaying an image. The display panel case has a protrusion portion formed at a first end. The main body section is disposed on a second surface. The main body section has an input section and a depressed portion. The depressed portion is formed at a second end of the second surface and has a pierced portion and a housing portion. The pierced portion is formed from the second surface to an opposite surface thereof such that a battery is attached to the pierced portion. The housing portion axially houses the protrusion portion on a side opposite to the input section with respect to the pierced portion.

Recent information processing apparatus such as laptop personal computers necessarily use a lithium ion battery or the like having high-capacity lithium ion cells for long time operation. Thus, it is necessary to use cells having a certain thickness. To downsize the laptop personal computer, it is necessary to stack the hinge and the battery. To thin the laptop personal computer, it is necessary to dispose the battery such that it protrudes backward and does not interfere with the hinge. In other words, the thickness of the laptop personal computer depends on the thickness of the hinge and the battery, whereas the planar size thereof depends on the size of the battery that protrudes backward.

According to this embodiment of the present invention, the depressed portion is formed at a second end of the second surface and has a pierced portion and a housing portion. The pierced portion is formed from the second surface to an opposite surface thereof such that a battery is attached to the pierced portion. The housing portion axially houses the protrusion portion on a side opposite to the input section with respect to the pierced portion. Thus, since the housing section that axially houses the protrusion portion can be prevented from being planarly stacked with the battery, the thickness of the information processing apparatus can be decided by the thickness of the battery and the display section. As a result, the information processing apparatus can be more thinned than the related art. In addition, since the housing section that axially houses the protrusion portion is disposed outside (opposite side of the input section) of the battery, the protrusion portion of the display section can be axially housed at the outermost position of the end of the information processing apparatus. Thus, the size of the information processing apparatus can be decided by that of the display section.

In addition, the size of the first surface of the display panel and the display panel case of the display section is nearly the same as the size of the second surface of the input section and the depressed portion having the pierced portion and the housing portion. As a result, the size of the information processing apparatus can be decided by the size of the display section. Thus, although the display section of the information processing apparatus is kept large, the entire information processing apparatus can be downsized.

According to another embodiment of the present invention, the information processing apparatus also includes a battery which is attachable to or detachable from the pierced portion. Thus, although the housing portion of the depressed portion is formed at the second end of the main body section of the information processing apparatus and the protrusion portion of the display section is housed in the housing portion, the battery can be very easily attached to and detached from the main body of the information processing apparatus.

According to another embodiment of the present invention, the battery has a thickness which is nearly the same as a thickness from the second surface to the opposite surface of the pierced portion. Thus, the battery does not protrude from the second surface of the main body section of the information processing apparatus and the opposite surface thereof. When the display section is closed to the main body section side of the information processing apparatus, the battery does not interfere with the display panel and so forth. As a result, the maximum thickness of the battery can be ensured.

According to another embodiment of the present invention, the battery attached to the pierced portion and the protrusion portion housed in the housing portion are placed between the second surface and the opposite surface. Thus, the battery and the protrusion portion do not protrude from the second surface of the main body section of the information processing apparatus and the opposite surface thereof. When the display section is closed to the main body section side of the information processing apparatus, the battery and the protrusion portion do not interfere with the display panel and so forth. As a result, the entire information processing apparatus can be downsized and thinned.

According to another embodiment of the present invention, the protrusion portion protrudes upward on the first surface of the display panel case and is axially held by support portions disposed on side walls of the housing portion such that the support portions sandwich protrusion portion. Thus, the axially housed protrusion portion does not increase the size (planar size) of the first surface. The size of the display section, namely the size of the entire information processing apparatus, can be decided by the size of only the display panel case of which the display panel and the protrusion portion are excluded from the display section. As a result, the maximum display area of the display section can be ensured.

According to another embodiment of the present invention, the protrusion portion contains an antenna which is capable of transmitting and receiving a signal. Thus, it is not necessary to dispose the antenna in the display panel case excluding the protrusion portion or the main body of the information processing apparatus. As a result, the display area can be increased. In addition, the entire information processing apparatus can be downsized.

According to another embodiment of the present invention, in the protrusion portion, at least a portion which covers the antenna is made of a resin material. Thus, the portion does not interfere with a radio wave transmitted and received by the antenna.

According to another embodiment of the present invention, the protrusion portion contains a circuit board electrically connected to the display panel. Thus, the circuit board can be removed from the display panel case excluding the protrusion portion. As a result, the display panel case can be more downsized and the display area can be more increased than the related art.

According to another embodiment of the present invention, the circuit board is electrically connected to the display panel through a flexible substrate. The circuit board has a semiconductor device which drives the display panel. Thus, the circuit board and so forth can be more effectively disposed in the protrusion portion than the related art.

According to another embodiment of the present invention, the second end has a tapered surface at a lower end on an outermost side opposite to the input portion. When the display section is rotated around a center of an axis for a predetermined open angle, the display panel case contacts the tapered surface. Thus, the open angle of the display section against the main body section of the information processing apparatus can be fixed as desired. As a result, the display section can be prevented from being excessively opened.

According to embodiments of the present invention, the entire information processing apparatus can be downsized and thinned.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which.

DESCRIPTION OF PREFERRED EMBODIMENTS

Next, with reference to the accompanying drawings, embodiments of the present invention will be described. In the following description, as an exemplary information processing apparatus, a laptop personal computer, hereinafter simply referred to as the personal computer, will be described. However, embodiments of the present invention are not limited to a personal computer.

Figure 1:
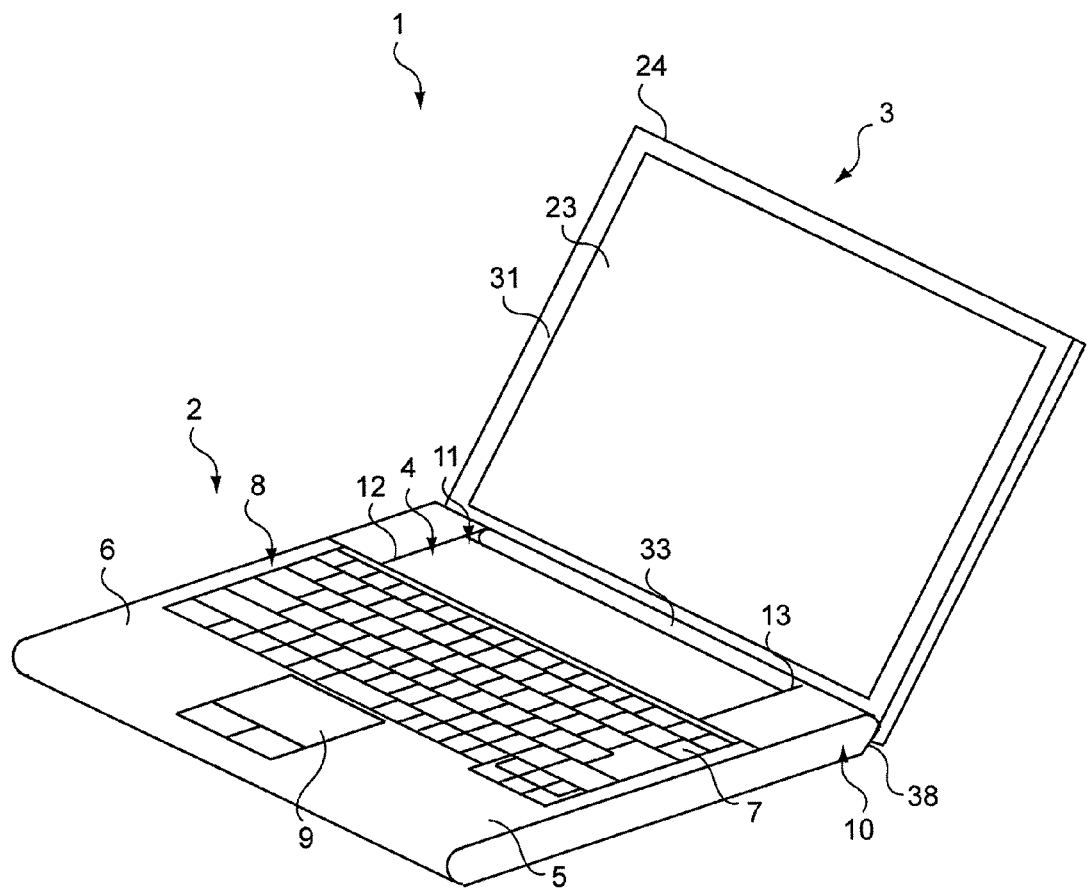
FIG. 1 is a perspective view showing an outline of a personal computer according to an embodiment of the present invention.
Figure 2:
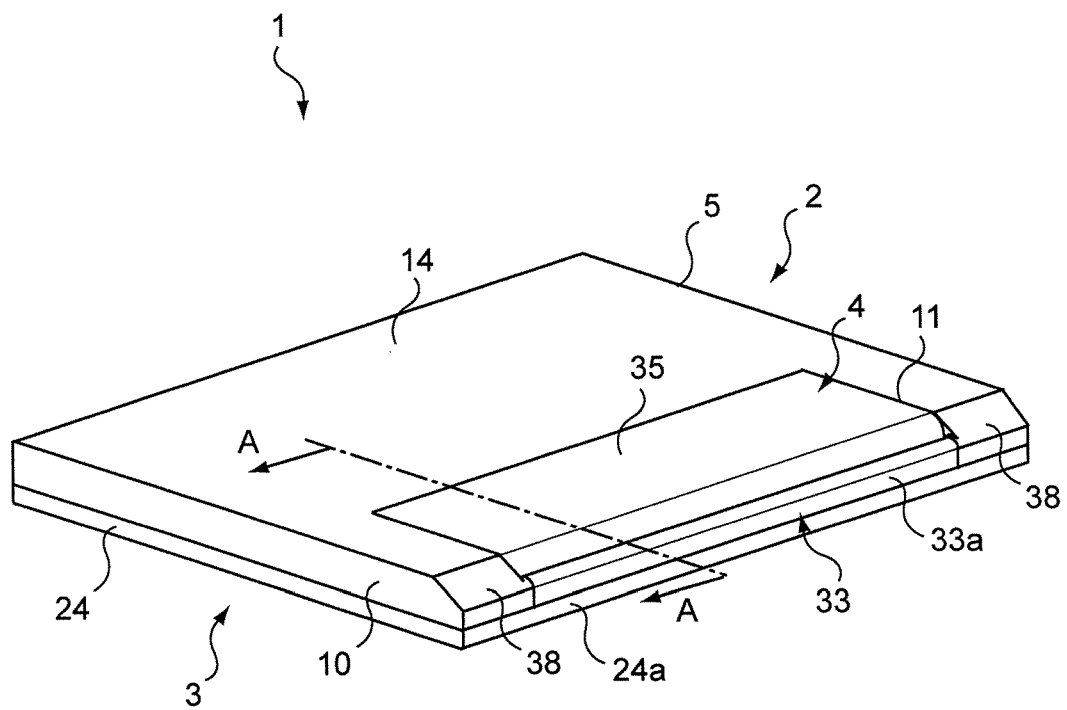
FIG. 2 is a perspective view showing an outline of a rear surface of the personal computer in the state of which a display section thereof has been closed.
Figure 3:
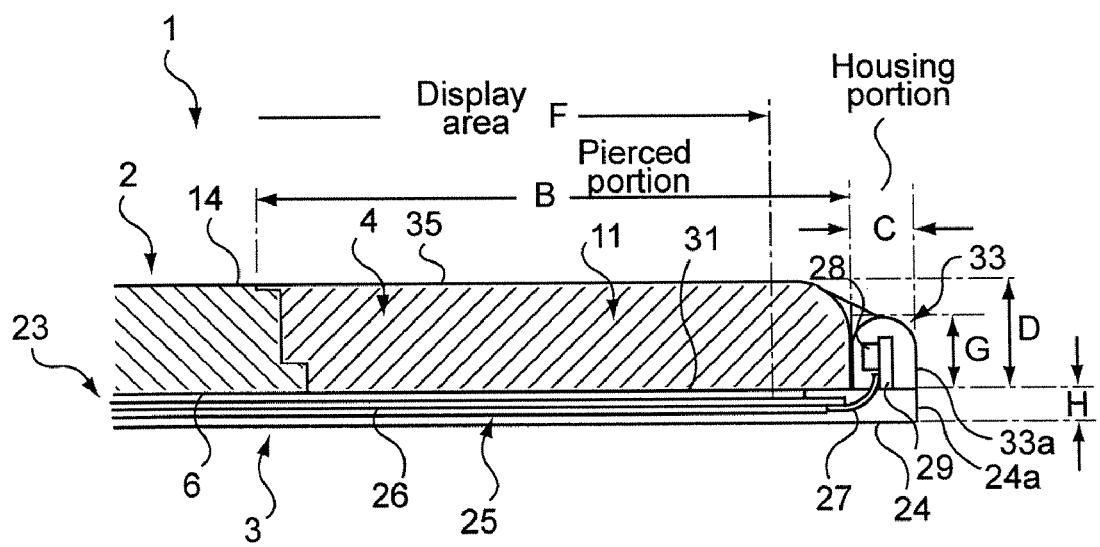
FIG. 3 is a sectional view taken along line A-A of FIG. 2.
Figure 4:
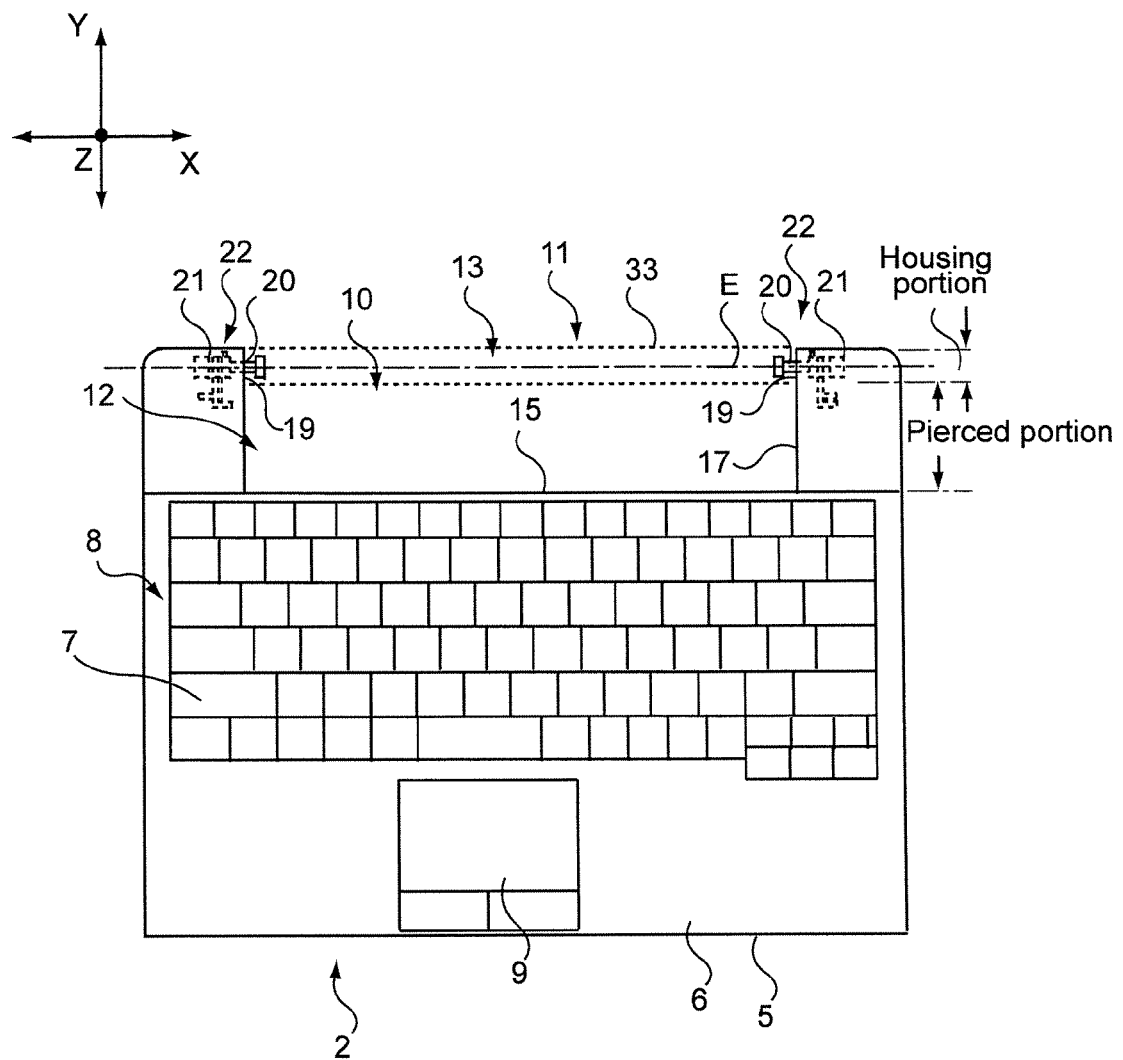
FIG. 4 is a plan view showing an outline of a main body section of the personal computer.
Figure 5:
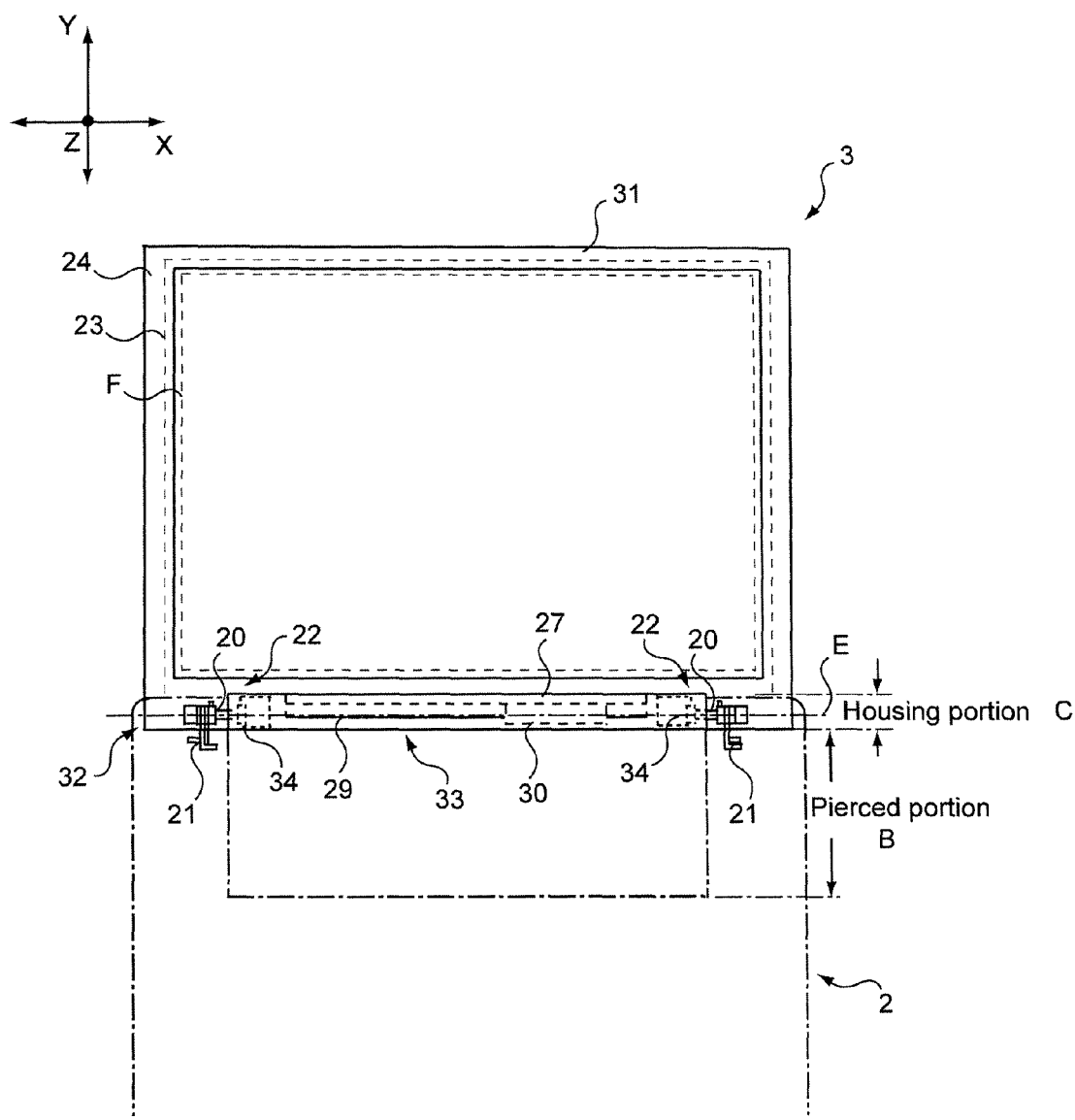
FIG. 5 is a schematic diagram describing the display section of the personal computer.
Figure 6:
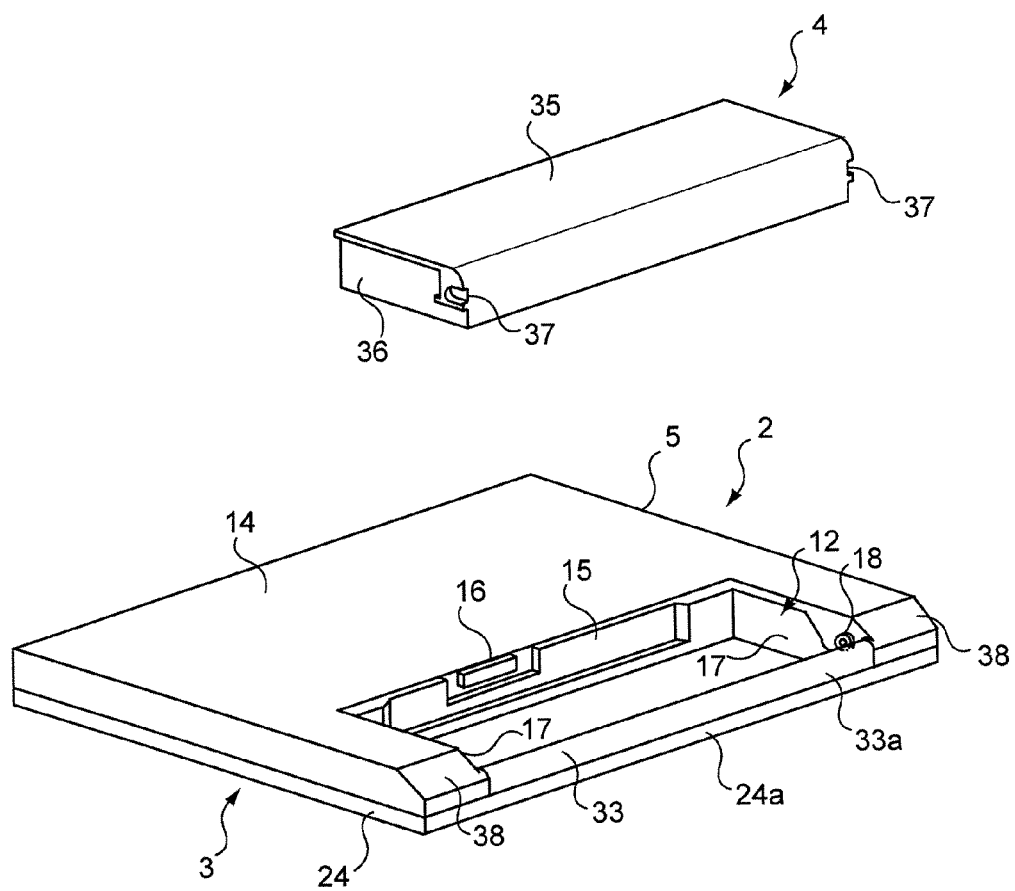
FIG. 6 is a schematic diagram describing the state of which a battery has been detached from the personal computer shown in FIG. 2.

FIG. 1 is a perspective view showing an outline of the personal computer according to an embodiment of the present invention in the state of which a display section of the personal computer has been opened. FIG. 2 is a perspective view showing an outline of a rear surface of the personal computer in the state that the display section has been closed. FIG. 3 is a sectional view taken along line A-A of FIG. 2. FIG. 4 is a plan view showing an outline of a main body section of the personal computer. FIG. 5 is a schematic diagram describing the display section. FIG. 6 is a schematic diagram describing the state of which a battery has been detached from the personal computer shown in FIG. 2. In these sectional views, for simplicity of description, the internal mechanisms of the main body section and the battery are omitted.

In FIG. 1, the personal computer is designated by reference numeral 1. As shown in FIG. 1, the personal computer 1 includes a main body section 2 that is the main body of the information processing apparatus and that performs an information process and so forth; a display section 3 that receives image information from the main body section 2, displays the image information, and can be opened and closed from and to the main body section 2 with a hinge mechanism (that will be described later); and a battery 4 that supplies a power supply voltage to the main body section 2.

As shown in FIG. 1 and FIG. 4, in this embodiment, the main body section 2 is covered by a nearly rectangular parallelepiped casing 5 made of a non-metal material such as a plastic. Disposed nearly at the center of an upper surface 6 as a second surface of the personal computer 1 are a key arrangement section 8 as an input section in which operation keys 7 are arranged, another pointing device 9, and so forth. Formed at the center of an end 10 as a second end of the personal computer 1 of a second end on the upper surface 6 is a depressed portion 11 of nearly rectangular shape facing the key arrangement section 8.

As shown in FIG. 4, integrally formed in the depressed portion 11 are a pierced portion 12 in which the battery is placed and that faces the key arrangement section 8 and a housing portion 13 that axially houses a protrusion portion (that will be described later) of the display section 3 and that is placed outside of the pierced portion 12 (namely, the side on which the pierced portion 12 that does not face the key arrangement section 8). In other words, as shown in FIG. 3 and FIG. 5, in the depressed portion 11, an area having length B (B shown in FIG. 3 and FIG. 5) from the key arrangement section 8 is the pierced portion 12 and an area having length C (C shown in FIG. 3 and FIG. 5) from the outside of the pierced portion 12 to the outermost position of the depressed portion 11 is the housing portion 13.

As shown in FIGS. 3 and 4, the pierced portion 12 is formed from the upper surface 6 of the main body section 2 to a rear surface 14 as the opposite surface of the upper surface 6. The thickness from the upper surface 6 to the rear surface 14 is nearly the same as thickness D (D shown in FIG. 3) of the battery 4 such that the battery 4 is placed in the pierced portion 12.

In addition, as shown in FIG. 6, the pierced portion 12 has a main body side connector 16 disposed nearly at the center of an inner wall 15 that faces the key arrangement section 8. The main body side connector 16 is electrically connected to a battery side connector (not shown) such that a power supply voltage is supplied from the battery 4 to the main body section 2 and the display section 3 through the main body side connector 16. In addition, as shown in FIG. 6, the pierced portion 12 has side walls 17 that face the housing portion 13. Formed in the side walls 17 are nearly cylindrical shaped raised portions 18 that are capable of being inserted into respective grooves 37 formed in the battery 4. Thus, as will be described later, the battery 4 can be very easily attached to the main body section 2.

As shown in FIG. 3 and FIG. 4, the housing portion 13 is formed on the outermost side of the depressed portion 11 that is cut from the end 10 of the main body section 2. As will be described later, a protrusion portion of the display section 3 is axially housing in the housing portion 13. Specifically, support portions 21 that rotatably support first ends of cylindrical connection pipes 20 are disposed in side walls 19 as inner walls of the housing portion 13. Second ends of the connection pipes 20 are rotatably held by holding portions 34 disposed in the protrusion portion (that will be described later) of the display section 3. With these members, a hinge mechanism 22 is structured. Thus, the display section 3 can be rotated around center E (E shown in FIG. 4) of a rotation axis in the housing portion 13. As a result, display area F (F shown in FIG. 3 and FIG. 5) of the display section 3 can be more widely obtained than the related art. In addition, while the same display area F is kept, the whole length of the personal computer 1 can be decreased.

In addition, as shown in FIG. 2 and FIG. 3, taper surfaces 38 are formed on the lower end of the outermost side on which a bottom surface 35 does not face the key arrangement section 8. Thus, when the display section 3 is maximally opened, a display panel case 24 touches the taper surfaces 38 as shown in FIG. 1. As a result, the display section 3 can be stably opened.

As shown in FIG. 3 and FIG. 5, the display section 3 has a display panel 23, which displays an image, and the foregoing display panel case 24, which has an opening such that the display panel 23 can display an image.

The display panel 23 is for example a liquid crystal display panel. As shown in FIG. 3, liquid crystal 26 is sandwiched by a pair of glass substrates 25. Electrodes (not shown) of the glass substrates 25 apply a voltage to the liquid crystal 26. The electrodes are electrically connected by a wiring pattern formed for example on a flexible substrate 27. A circuit board 29 on which a liquid crystal driver 28 as a semiconductor device is mounted is electrically connected to the wiring pattern.

In addition, the circuit board 29 has an antenna 30 through which a signal can be transmitted to and received from the outside. The antenna 30 is applicable to for example the Bluetooth, which is a near distance wireless communication standard established by five companies of Japan, Europe, and the United States in May 1998.

As shown in FIG. 3 and FIG. 5, formed nearly at the center of a display side surface 31 as a first surface that displays an image is a frame-shaped rectangular opening such that the display panel 23 can display an image. The display panel case 24 has a protrusion portion 33 that protrudes nearly vertically upward from an end 32 as a first end of the frame-shaped display side surface 31.

As shown in FIG. 3, the protrusion portion 33 protrudes upward nearly in a square shape from the display side surface 31 and has an upper end of semi-circular shape. As shown in FIG. 2 and FIG. 3, a side surface 33a opposite to the pierced portion 12 is formed such that it is connected to an end surface 24a of the display panel case 24.

In addition, as shown in FIG. 4 and FIG. 5, the protrusion portion 33 has a width (in the direction of the X axis shown in FIG. 5) such that the protrusion portion 33 fits the housing portion 13. The end 32 of the display section 3 nearly matches the end 10 of the main body section 2. As a result, the whole length of the personal computer 1 can be decreased to the length of the display section 3. Thickness G (G shown in FIG. 3) in the direction of which the protrusion portion 33 protrudes upward is smaller than thickness D from the upper surface 6 of the main body section 2 to the rear surface 14 (G<D). Thus, the thickness of the personal computer 1 can be decided by thickness D of the battery 4 and thickness H (H shown in FIG. 3) of the display section 3.

In addition, as shown in FIG. 3 and FIG. 5, the protrusion portion 33 has a cavity in which the flexible substrate 27 connected to the glass substrates 25, the circuit board 29 electrically connected to the flexible substrate 27, and the antenna 30 are disposed. Since the antenna 30, the circuit board 29, and the flexible substrate 27 are disposed in the cavity of the protrusion portion 33, the area of the display panel case 24 in the display side surface 31 can be decreased. Thus, display area F becomes large. In the protrusion portion 33, a portion that covers the protrusion portion 33 is made of a non-metal material for example a resin material such as a plastic such that the portion does not interfere with a radio wave received and transmitted by the antenna 30.

In addition, as shown in FIG. 5, the protrusion portion 33 has the foregoing holding portion 34 that rotatably holds the first ends of the connection pipes 20 of the main body section 2. Wires (not shown) that are electrically connected to the circuit board 29 are routed to the main body section 2 through the connection pipes 20. Thus, the hinge mechanism 22 is composed of the support portions 21 and the connection pipes 20 of the main body section 2 and the holding portions 34 of the display section 3. The center axes of these members match center E (E shown in FIG. 4 and FIG. 5) of the rotation axis of the display section 3. As a result, the display section 3 can be opened and closed around the center of the rotation axis.

As shown in FIG. 1, FIG. 3, and FIG. 4, the battery 4 is placed in the pierced portion 12 of the main body section 2. The front surface of the battery 4 becomes a part of the upper surface 6 of the main body section 2. The bottom surface 35 of the battery 4 becomes a part of the rear surface 14 of the main body section 2. In other words, thickness D from the upper surface 6 to the rear surface 14 nearly matches the thickness of the battery 4.

As shown in FIG. 6, formed in side walls 36 of the battery 4 are the grooves 37 that fit the raised portions 18 of the side walls 17 of the pierced portion 12. The battery 4 has a battery side connector (not shown) at a position corresponding to the main body side connector 16.

In addition, the battery 4 contains a plurality of secondary battery cells such as lithium secondary battery cells. The battery 4 supplies a power supply voltage to the main body section through the battery side connector and the main body side connector 16.

In the foregoing description, the battery 4 is placed in the pierced portion 12 of the depressed portion 11. Instead, when the battery 4 may be placed on the key arrangement section 8 side, which is an input section, from the housing portion 13 that houses the protrusion portion 33, the personal computer 1 can be thinned and downsized up to the size of the display section 3. Of course, it is more preferred that the battery 4 be placed in the pierced portion 12 because the thickness of the personal computer 1 can be decided by the thickness of the display section 3 and the thickness of the battery 4.

Figure 7:
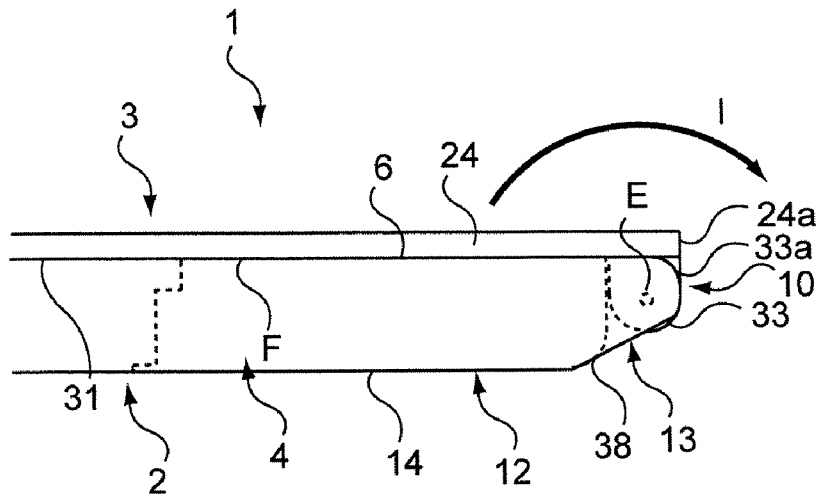
FIG. 7A and FIG. 7B are schematic diagrams describing the states of which the display section of the personal computer has been closed and opened, respectively.
Figure 7:
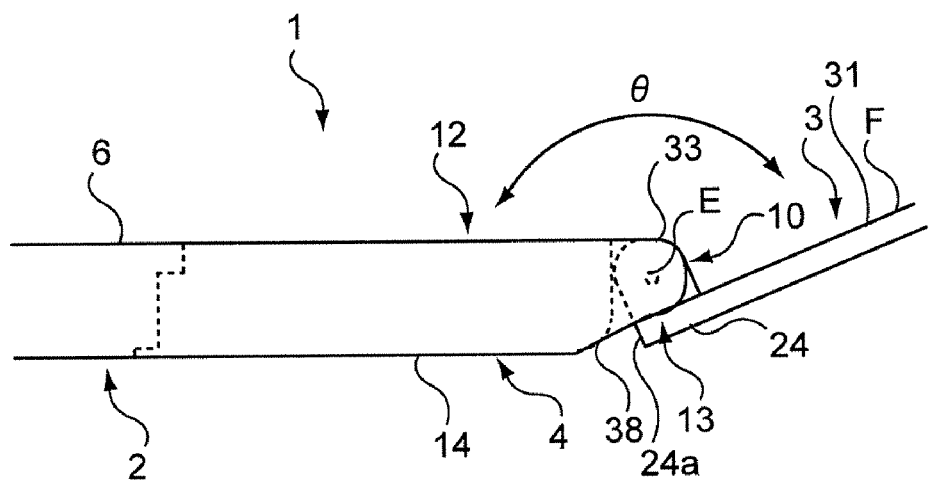
Figure 8:
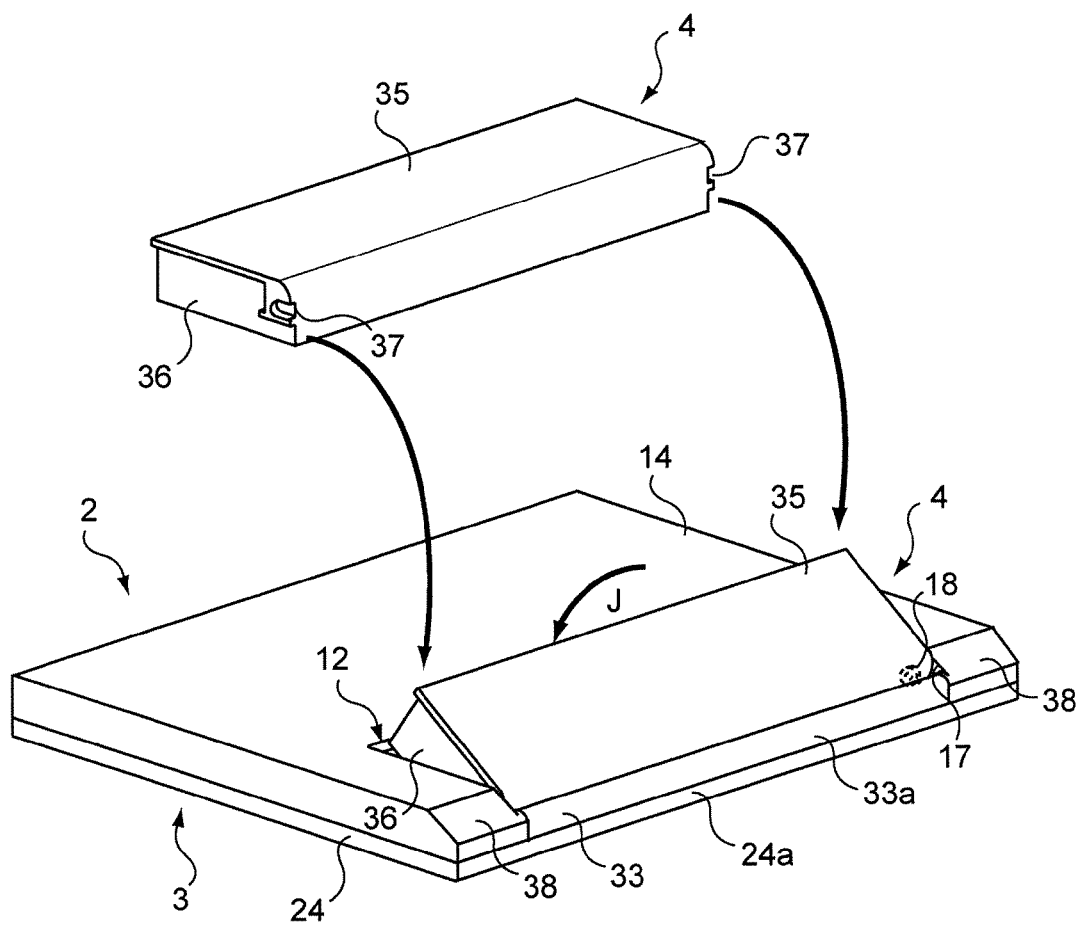
FIG. 8 is a schematic diagram describing the state of which the battery is attached to the personal computer.

Next, focusing on the opening and closing of the display section 3 and attachment and detachment of the battery 4, the operation of the personal computer 1 will be described. FIG. 7A and FIG. 7B are schematic diagrams describing the states of which the display section of the personal computer has been closed and opened, respectively. FIG. 8 is a schematic diagram describing the state of which the battery is attached to the personal computer.

FIG. 7A shows the state of which the display side surface 31 of the display section 3 has been closed to the upper surface 6 of the main body section 2. In this state, the housing portion 13 of the main body section 2 and the protrusion portion 33 of the display section 3 protrude from the battery 4. In addition, the protrusion portion 33 protrudes from the display side surface 31 of the display panel case 24. Thus, the size (of the upper surface 6) of the main body section 2 nearly matches the size (of the display side surface 31) of the display section 3.

When a slide lever (not shown) is unlocked and the display section 3 is rotated around center E of the rotation axis as designated by I shown in FIG. 7A, the display section 3 can be opened as shown in FIG. 7B. At this point, as shown in FIG. 7B, since the upper portion at the end 10 of the housing portion 13 is formed in an arc shape, the end 10 does not interfere with the display section 3. Thus, the display section 3 can be smoothly rotated. In addition, since the battery 4 does not protrude to the housing portion 13, which houses the protrusion portion 33, and to the outermost side of the end 10, while display area F is kept wide, the display section 3 can be opened and closed around center E of the rotation axis.

When the angle from the upper surface 6 to the display side surface 31 becomes θ, the display panel case 24 of the display side surface 31 contacts the taper surfaces 38 formed below the end 10 of the housing portion 13 as shown in FIG. 7B. As a result, the display section 3 can be fixed at a desired angle.

Next, attachment and detachment of the battery 4 to and from the main body section 2 (pierced portion 12) will be described.

When the battery 4 is attached to the pierced portion 12 of the main body section 2 as shown in FIG. 8, the end of the battery 4 is inserted into the pierced portion 12 at an angle such that the raised portions 18 formed on the side walls 17 are inserted into the grooves 37 formed in the side walls 36 of the battery 4.

Thereafter, in the state shown in FIG. 8, the bottom surface 35 of the battery 4 is pushed while the bottom surface 35 is rotated in the direction of arrow J shown in FIG. 8 such that the battery side connector is electrically connected to the main body side connector 16. As a result, the battery 4 is attached to the main body section 2 (pierced portion 12). When the battery 4 is correctly attached to the main body section 2, the battery 4 is locked to the main body section 2 with a click sound. As a result, the battery 4 can be prevented from dropping from the pierced portion 12.

When the reverse operation of the foregoing operation is performed, the battery 4 can be safely and quickly detached from the main body section 2 (pierced portion 12).

In this embodiment of the present invention, the depressed portion 11 is formed at the end 10 of the main body section 2 of the personal computer 1. The depressed portion 11 has the pierced portion 12 formed on the key arrangement section 8 side and the housing portion 13 that axially houses the protrusion portion 33 of the display section 3 outside of the pierced portion 12 (opposite side of the key arrangement section 8). Thus, the housing portion 13 that axially houses the protrusion portion 33 can be prevented from planarly overlapping with the battery 4. As a result, the thickness of the personal computer 1 can be decided by thickness (D+H) of the battery 4 and the display section 3. As a result, the personal computer 1 can be more thinned than the related art. In addition, since the housing portion 13 that axially houses the protrusion portion 33 is formed outside of the battery 4 (opposite side of the input section), the protrusion portion 33 of the display section 3 can be axially housed at the outermost position of the end 10 of the main body section 2. Thus, the size of the personal computer 1 can be decided nearly by the size of the display section 3. As a result, the personal computer 1 can be more downsized than the related art.

In addition, since the size of each of the display panel 23 of the display section 3 and the display side surface 31 of the display panel case 24 is nearly the same as the size of the upper surface 6 that includes the key arrangement section 8 and the depressed portion 11 having the pierced portion 12 and the housing portion 13, the size of the personal computer 1 can be decided by the size of the display section 3. Thus, while the display section 3 has a large screen, the entire personal computer can be more downsized than the related art.

In addition, since the battery 4 is attached to and detached from the rear surface 14 of the pierced portion 12, although the housing portion 13 of the depressed portion 11 that houses the protrusion portion 33 of the display section 3 is formed at the end 10 of the main body section 2, the battery 4 can be very easily attached and detached.

Since the thickness of the battery 4 is nearly the same as thickness D from the upper surface 6 to the rear surface 14 of the pierced portion 12, the battery 4 does not protrude from the upper surface 6 and the rear surface 14 of the main body section 2. In addition, when the display section 3 is closed to the main body side, the battery 4 does not interfere with the display panel and so forth. As a result, the maximum thickness of the battery 4 can be ensured.

In addition, the protrusion portion 33 protrudes upward on the display side surface 31 of the display panel case 24. The protrusion portion 33 is axially held by the support portions 21 disposed on the side walls 17 of the housing portion 13 such that the support portions 21 sandwich the protrusion portion 33. Thus, the protrusion portion 33 that is axially held by the support portion 21 does not planarly increase the size of the display side surface 31. As a result, the size of the display side surface 31, namely the size of the entire personal computer 1, can be decided only by the size of the display panel 23, which displays an image, and the size of the display panel case (excluding the protrusion portion 33). As a result, display area F of the display section 3 can be maximized.

In addition, since the protrusion portion 33 contains the antenna 30 that can transmit and receive a signal, it is not necessary to dispose the antenna 30 in the display panel case excluding the protrusion portion 33 of the display section 3 or the main body section. Thus, the entire personal computer can be downsized.

In addition, since in the protrusion portion 33, a portion that covers the antenna 30 is made of a resin material such as a plastic, it does not interfere with a signal such as a radio wave that the antenna 30 can transmit and receive.

In addition, since the protrusion portion 33 contains the circuit board 29 electrically connected to the display panel 23, the circuit board 29 can be removed from the display panel case 24 excluding the protrusion portion 33. As a result, the display panel case 24 as the display side surface 31 can be more downsized and thereby display area F of the display section 3 can be more increased than the related art.

In addition, since the circuit board 29 is electrically connected to the display panel 23 through the flexible substrate 27 and has the liquid crystal driver 28 that drives the display panel 23 as a liquid crystal display panel, the protrusion portion 33 can more effectively contain the circuit board and so forth than the related art.

In addition, the end 10 has the taper surfaces 38 at the lower end on the outermost side opposite to the key arrangement section 8. When the display section 3 is rotated around center E of the rotation axis for a predetermined angle (angle θ from the upper surface 6), the display panel case 24 contacts the taper surfaces 38. Thus, the display section 3 can be easily kept at a desired open angle and the display section 3 can be prevented from being excessively opened from the main body section 2.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus, comprising:
a display section disposed on a first surface and having a display panel and a display panel case, the display panel case housing the display panel such that the display panel is capable of displaying an image, the display panel case having a protrusion portion formed at a center thereof; and
a main body section disposed on a second surface and having an input section and a depressed portion, the depressed portion being formed at a second end of the second surface and having a pierced portion and a housing portion, the pierced portion penetrating through from the second surface to an opposite surface thereof such that a battery is attached to the pierced portion, the housing portion axially housing the protrusion portion on a side opposite to the input section with respect to the pierced portion.

2. The information processing apparatus as set forth in claim 1, further comprising:
a battery which is attachable to or detachable from the pierced portion.

3. The information processing apparatus as set forth in claim 2,
wherein the battery has a thickness which is nearly the same as a thickness from the second surface to the opposite surface of the pierced portion.

4. The information processing apparatus as set forth in claim 2,
wherein the battery attached to the pierced portion and the protrusion portion housed in the housing portion are placed between the second surface and the opposite surface.

5. The information processing apparatus as set forth in claim 1,
wherein the protrusion portion contains a circuit board electrically connected to the display panel.

6. The information processing apparatus as set forth in claim5,
wherein the circuit board is electrically connected to the display panel through a flexible substrate and has a semiconductor device which drives the display panel.

7. The information processing apparatus as set forth in claim 1,
wherein the second end has a tapered surface at a lower end on an outermost side opposite to the input portion, and
wherein when the display section is rotated around a center of an axis for a predetermined open angle, the display panel case contacts the tapered surface.

8. An information processing apparatus comprising:
a display section disposed on a first surface and having a display panel and a display panel case, the display panel case housing the display panel such that the display panel is capable of displaying an image and having a protrusion portion formed at a first end; and
a main body section disposed on a second surface and having an input section and a depressed portion, the depressed portion being formed at a second end of the second surface and having a pierced portion and a housing portion, the pierced portion penetrating through from the second surface to an opposite surface thereof such that a battery is attached to the pierced portion, the housing portion axially housing the protrusion portion on a side opposite to the input section with respect to the pierced portion,
wherein the protrusion portion protrudes upward on the first surface of the display panel case and is axially held by support portions disposed on side walls of the housing portion such that the support portions sandwich protrusion portion.

9. An information processing apparatus comprising:
a display section disposed on a first surface and having a display panel and a display panel case, the display panel case housing the display panel such that the display panel is capable of displaying an image and having a protrusion portion formed at a first end; and
a main body section disposed on a second surface and having an input section and a depressed portion, the depressed portion being formed at a second end of the second surface and having a pierced portion and a housing portion, the pierced portion penetrating through from the second surface to an opposite surface thereof such that a battery is attached to the pierced portion, the housing portion axially housing the protrusion portion on a side opposite to the input section with respect to the pierced portion, wherein the protrusion portion contains an antenna which is capable of transmitting and receiving a signal.

10. The information processing apparatus as set forth in claim 9, wherein in the protrusion portion, at least a portion which covers the antenna is made of a resin material.

* * * * *